United States Patent [19]
Smidth et al.

[11] Patent Number: 5,301,018
[45] Date of Patent: Apr. 5, 1994

[54] METHOD AND APPARATUS FOR SHUFFLING IMAGE DATA INTO STATISTICALLY AVERAGED DATA GROUPS AND FOR DESHUFFLING THE DATA

[75] Inventors: Peter Smidth, Menlo Park; Charles H. Coleman, Redwood City; Sidney D. Miller, Mt. View, all of Calif.

[73] Assignee: Ampex Systems Corporation, Redwood City, Calif.

[21] Appl. No.: 106,968

[22] Filed: Aug. 16, 1993

Related U.S. Application Data

[63] Continuation of Ser. No. 654,710, Feb. 13, 1991, abandoned.

[51] Int. Cl.⁵ .............................................. H04N 7/12
[52] U.S. Cl. ..................................... 348/420; 348/472; 348/409
[58] Field of Search ................. 358/141, 138, 140, 12, 358/433, 453, 457, 458, 160, 133, 135, 136, 13; 382/56; H04N 7/12, 7/13

[56] References Cited

U.S. PATENT DOCUMENTS

| | | | |
|---|---|---|---|
| 3,795,763 | 3/1974 | Golding | 178/5.6 |
| 3,803,348 | 4/1974 | Limb | 178/5.4 |
| 4,023,199 | 5/1977 | Netravali | 358/13 |
| 4,025,950 | 5/1977 | Matsumoto | 358/133 |
| 4,068,258 | 1/1978 | Bied-Charreton | 358/4 |
| 4,175,270 | 11/1979 | Zenzefilis | 358/128 |
| 4,204,227 | 5/1980 | Gurley | 358/138 |
| 4,302,775 | 11/1981 | Widergren et al. | 358/136 |
| 4,383,272 | 5/1983 | Netravali et al. | 358/136 |
| 4,394,774 | 7/1983 | Widergren et al. | 382/56 |
| 4,447,886 | 5/1984 | Meeker | 364/725 |
| 4,494,144 | 1/1985 | Brown | 358/133 |
| 4,504,860 | 3/1985 | Nicol et al. | 358/133 |
| 4,541,012 | 9/1985 | Teacher | 358/133 |
| 4,580,134 | 4/1986 | Campbell et al. | 340/703 |
| 4,626,829 | 12/1986 | Hauck | 340/347 |
| 4,654,696 | 3/1987 | Dayton et al. | 358/11 |
| 4,656,511 | 4/1987 | Koga | 358/133 X |
| 4,672,467 | 6/1987 | Heitmann | 358/314 |
| 4,679,094 | 7/1987 | Rutherford et al. | 358/261 |
| 4,682,248 | 7/1987 | Schwartz | 360/32 |
| 4,694,336 | 9/1987 | Keesen et al. | 358/133 |

(List continued on next page.)

OTHER PUBLICATIONS

The D-2 Digital Video Recorder-John Watkinson undated.

(List continued on next page.)

*Primary Examiner*—Victor R. Kostak
*Attorney, Agent, or Firm*—George B. Almeida

[57] ABSTRACT

In a data compression process such as employed to compress video or other data, it is preferable not to compress the image data representative of the video image in a sequential format, or to take the data from the same area of the image. To equalize the information content of the data prior to compression, the present shuffling/deshuffling technique divides the video image into a multitude of image representing blocks, and selects a predetermined number of the image blocks from different spatial locations in the image, to form a succession of data sets representative of the video image information. That is, the selection of the image representing blocks is such that the information content (complexity) in each data set is similar to the information content in each other data set and further similar to the average information content of the entire video image. Thus, the subsequent quantizing factor used in the compression process will tend to be similar for successive data sets, thereby reducing any distortion introduced by the compression process. The image representing blocks may be formed of sequentially scanned blocks of the video image, or of transform coefficients representing similar blocks of the video image. The shuffled data is deshuffled by the inverse process.

46 Claims, 6 Drawing Sheets

U.S. PATENT DOCUMENTS

| | | | |
|---|---|---|---|
| 4,698,694 | 10/1987 | Tomita et al. | 358/326 |
| 4,740,832 | 4/1988 | Sprague et al. | 358/21 |
| 4,743,960 | 5/1988 | Duvic et al. | 358/13 |
| 4,758,881 | 7/1988 | Laspada | 358/21 |
| 4,764,805 | 8/1988 | Rabbani et al. | 358/13 |
| 4,768,082 | 8/1988 | Hiratsuka et al. | 358/13 |
| 4,774,562 | 9/1988 | Chen et al. | 358/13 |
| 4,775,897 | 10/1988 | Umemoto et al. | 358/311 |
| 4,783,841 | 11/1988 | Crayson | 382/56 |
| 4,797,741 | 1/1989 | Sato et al. | 358/138 |
| 4,802,003 | 1/1989 | Takei et al. | 358/133 |
| 4,837,724 | 6/1989 | Borgers | 358/133 X |
| 4,847,677 | 7/1989 | Music et al. | 358/13 |
| 4,849,807 | 7/1989 | Music et al. | 358/13 |
| 4,857,991 | 8/1989 | Music et al. | 358/13 |
| 4,862,167 | 8/1989 | Copeland, III | 341/107 |
| 4,868,653 | 9/1989 | Golin et al. | 358/133 |
| 4,941,044 | 7/1990 | Trew | 358/133 X |
| 5,031,038 | 7/1991 | Guillemot et al. | 358/133 |
| 5,136,371 | 8/1992 | Savatier et al. | 358/133 |

OTHER PUBLICATIONS

An Experimental Study for Home-Use Digital VTR IEEE Trans on Consumer Electronics vol. 35 No. 3 Aug. 1989.

Scene Adaptive Coder Trans on Communications vol. Com 32, No. 3, Mar. 1984.

Spatial Translations on Comm Technology vol. COM-19 No. 6 Dec. 1971.

"Picture Code: A Review", Netravalli et al. IEEE Proceedings vol. 68 #3, Mar. 1980.

"The Role of Image Data Compression in Professional Video Recording", Kearney et al. SMPTE Conference Oct 21–25, 1989.

"Pyramid Vector Quantization of Color Imagery" Fischer et al. IEEE Conference Jun. 9, 1987.

"Transform and Hybrid Transform IDPCM Coding of Images Using Pyramid Vector Quantization"; Tseng et al.; IEEE Transactions on Communications; vol. 35 #1, Jan. 1987.

"A Pyramid Vector Quantizer", Fischer; IEEE Transaction vol. IT-32 #4, Jul. 1986.

A Study On Trick Plays for Digital VCR, C. Yamamitzu et al., IEEE Trans. On Consumer Elect, vol. 37, No. 3, Aug., 1991.

Bit Rate Reduction Alogrithum For a Digital VCR, S. I. Kim et al., IEEE Trans. on Consumer Elect, vol. 37, No. 3, Aug., 1991.

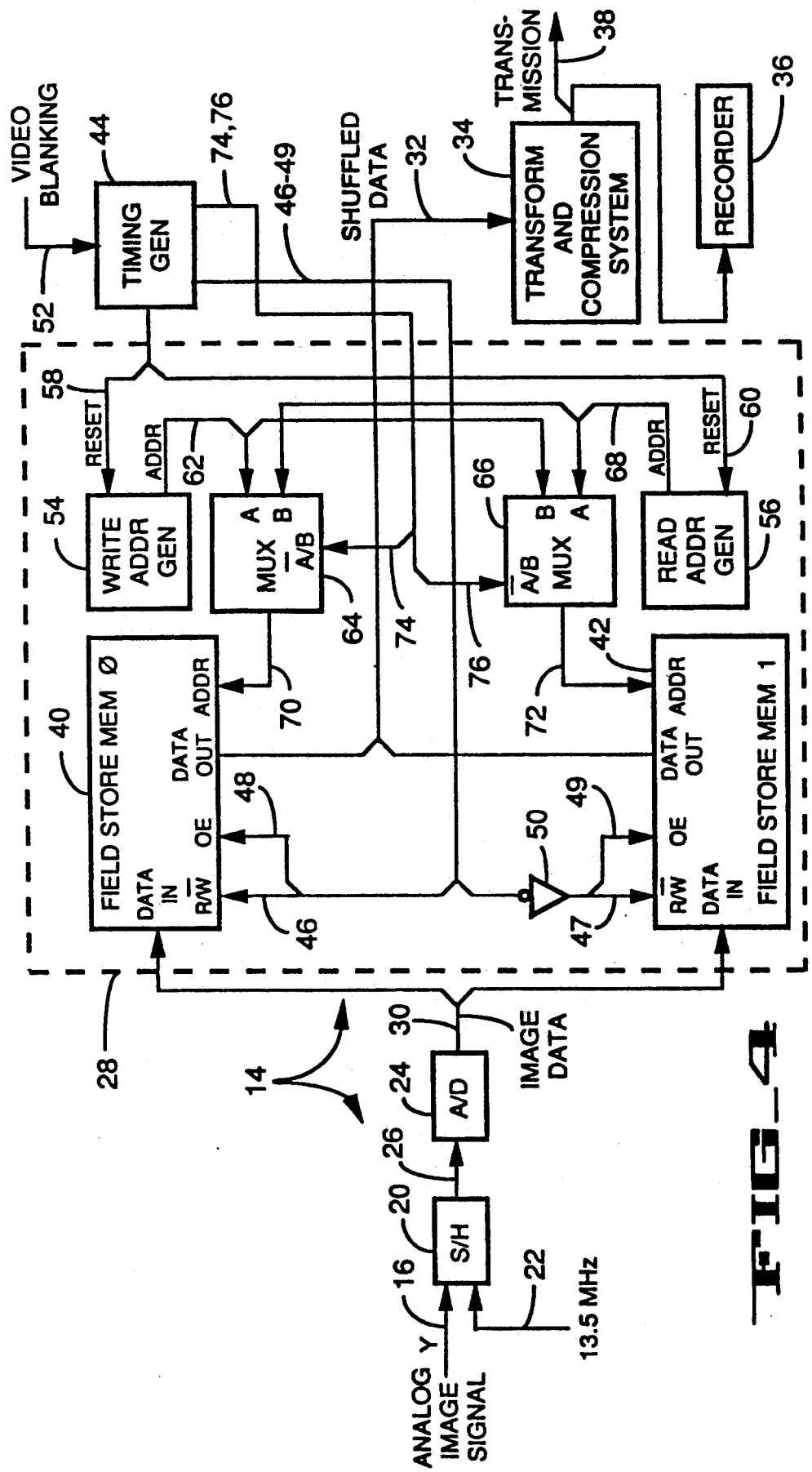

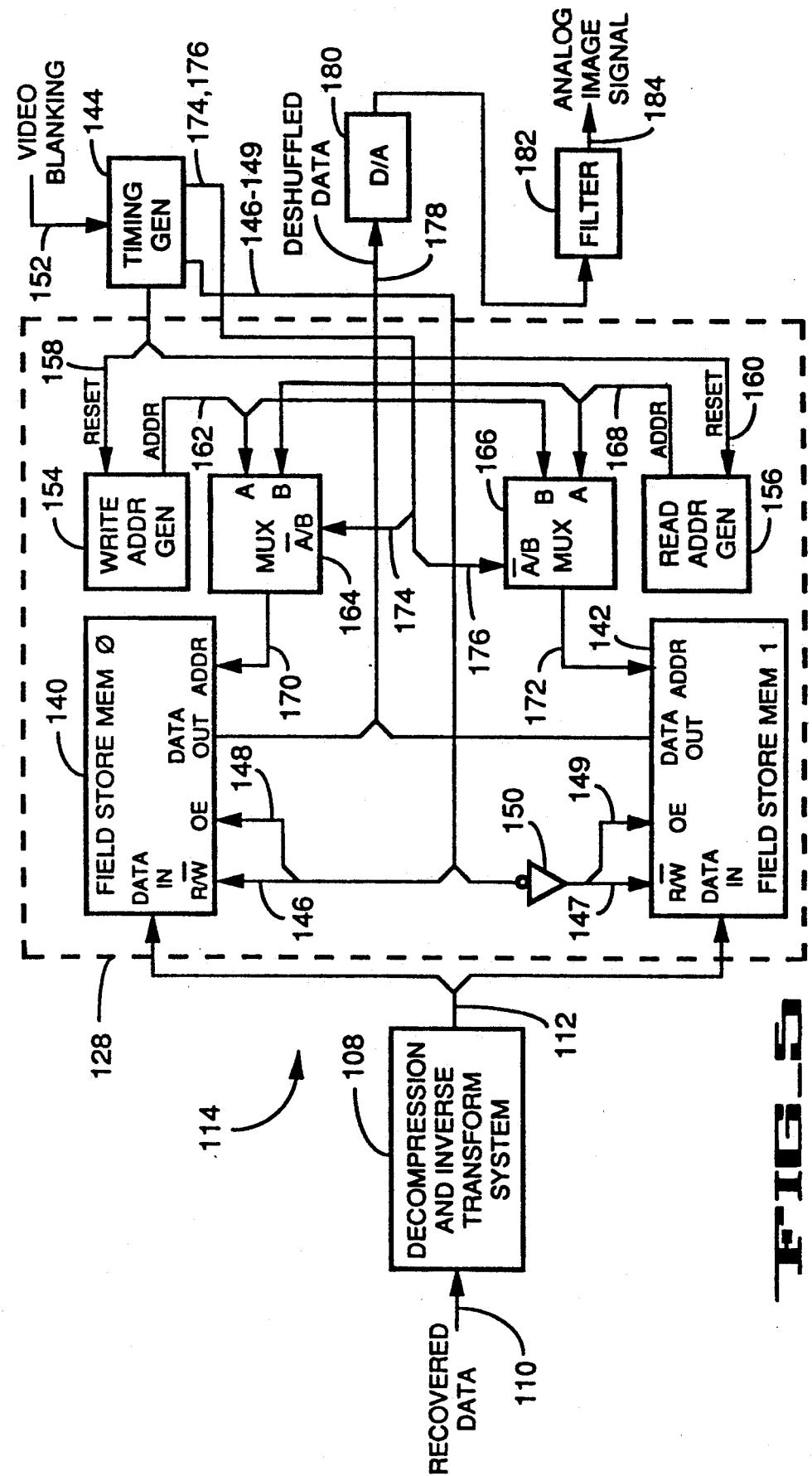
FIG_5

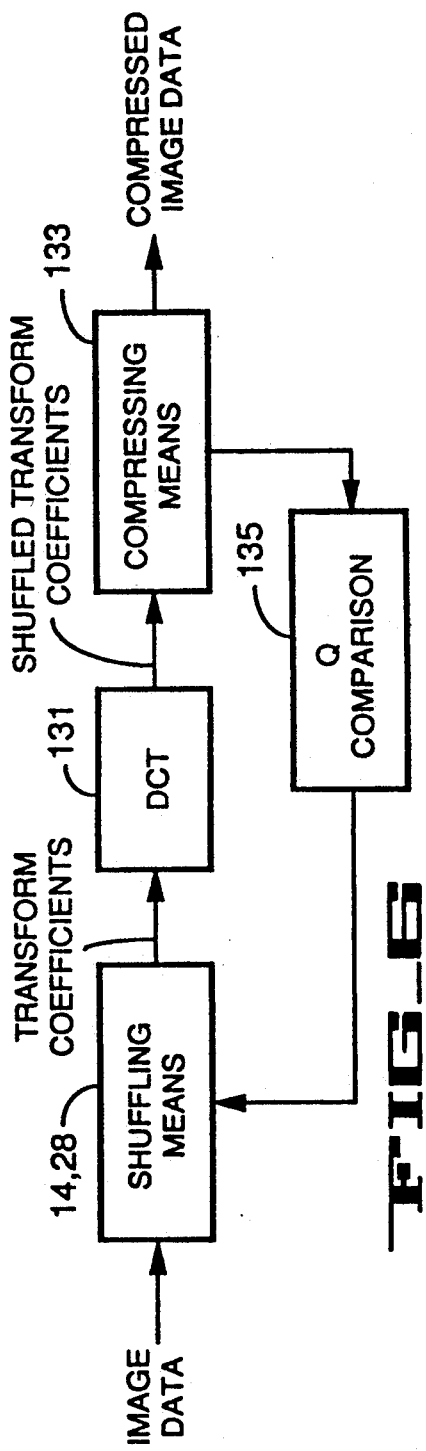
FIG_6
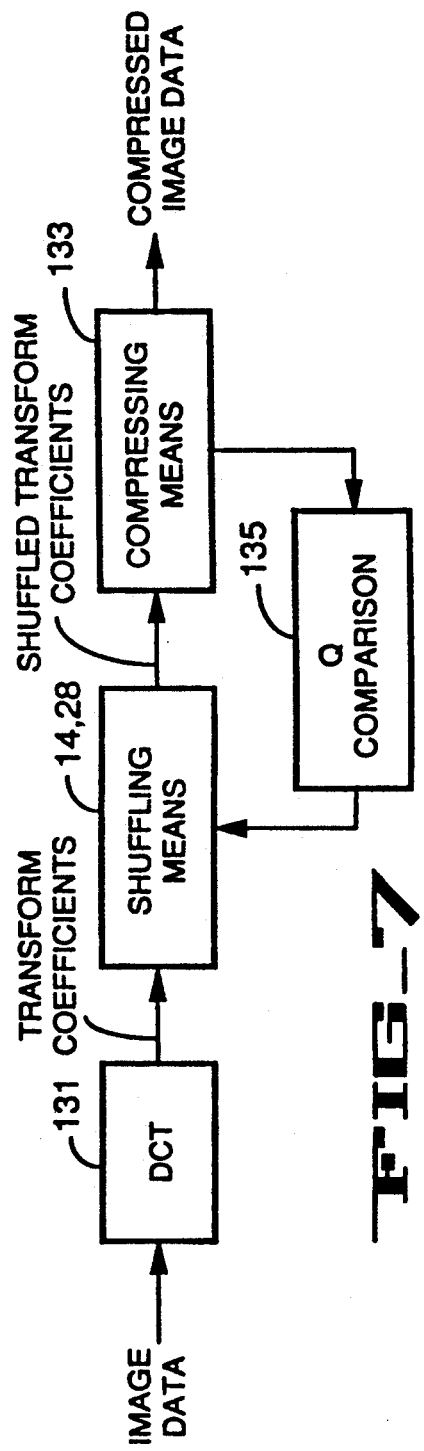
FIG_7

METHOD AND APPARATUS FOR SHUFFLING IMAGE DATA INTO STATISTICALLY AVERAGED DATA GROUPS AND FOR DESHUFFLING THE DATA

This is a continuation of copending application Ser. No. 07/654,710 filed on Feb. 13, 1991 now abandoned.

BACKGROUND OF THE INVENTION

This invention relates to the real-time compression of digital video signals suitable for the transmission of digital data either through a communications channel, or for recording and playback on a magnetic tape recorder or other recording medium. More particularly, the present invention relates to a technique for shuffling of image data to equalize the information content thereof prior to compressing the data into fixed code block lengths, which then may be recorded in, and recovered from, a recording medium.

In general, the goal of data compression is to send digital information from one point to another through a transmission channel using the least transfer of data as is possible. In other words, the object is to eliminate the transmission of as much redundant data as is possible. Video images, by their very nature, contain a great deal of redundancy and thus are good candidates for data compression. It is also well known that on a statistical basis, a straight-forward digital representation of an image necessarily contains redundancy both in a spatial sense and in a temporal sense. By removing a portion of the redundancy from the image data at a transmitter, the amount of data transmitted over a communications channel or recorded on a storage medium may be substantially reduced. The image then may be reconstructed at the receiver or, if recorded, in the recorder playback electronics, by reintroducing the redundancy removed at the transmitter. Incidentally, the expression "image data" as used herein refers to data defining an image to be displayed in a two-dimensional spatial image, which may also take the form of a time varying image composed of multiple frames which are equally spaced in time. The exact form or structure of "image data" can take any of a variety of well-known forms, and in this regard it should be noted that the present invention is broadly applicable to any type of signal representing a two-dimensional space. For example, such a signal might be a moving scene derived from a video camera.

From a very general perspective, there are two classes of data compression: lossless compression and lossy compression. Lossless compression, as the name implies, allows the original data to be exactly reconstructed after being compressed without any loss of information. Whereas, lossy data compression is an irreversible process which introduces some amount of distortion into the compressed data so that the original data cannot be exactly reproduced. In order to obtain large compression factors for images, it is necessary to use lossy compression methods of the type described herein. Lossy compression may be an acceptable alternative as long as the amount and type of distortion produced in the reconstructed image are not objectionable. However, what is deemed "objectionable" in one industry is not so in another. For example, in the professional video industry where the signal-to-noise ratio typically requires 50 decibels (dB) or better, the reconstructed image must be virtually indistinguishable from the original, i.e., any more than 2 or 3 dB of signal impairment is objectionable since it is noticeable to viewers of a video display.

Image compression for use in conjunction with digital video tape recorders has several unique requirements which impose additional constraints on any compression method used. The unusual constraints arise from the typical modes of use of a video tape recorder, and from the fact that the data must be stored for later use rather than immediately transmitted. For example, a tape recorder must allow editing of the recorded information. Practically, this means that the stored data for one field occupy an integral number of tracks on the tape or occupy defined blocks of video data, such as a television field, at predictable locations or tracks on the tape, (especially for editing purposes). This imposes the constraint that a field of data be constant in length. Such a seemingly simple constraint places a severe design requirement on any compression scheme. Because most images statistically are non-stationary (that is, the statistical distribution of the information content varies as a function of position within the image), the obvious solution to compressing a digital signal having varying information content would be to allow the encoded data rate to vary on a frame-by-frame or field-by-field temporal basis according to the information content of the image. But because of editing requirements, the encoded data rate must be fixed rather than variable. In the edit mode, the replacement of recorded information by new information requires that the smallest unit of information to be replaced (in television signals this is a single field) be allotted a fixed data block length in the recorded data format. This allows any unit of a video signal to be replaced with any equally sized unit of a video signal.

Video tape recorders for television broadcast applications must also allow pictures to be reproduced at higher than normal record/playback tape transport speeds (picture in shuttle). At the exceedingly higher playback speeds associated with the picture in shuttle mode, only a fraction of the data on each track is recovered. This requires that the compressed recorded data be stored in small complete data blocks from which a most significant portion of the picture may be recovered even at the higher speed.

To maintain maximum efficiency in recording and to minimize gaps for record over-runs, it is best to use a record format which has a fixed short period related to the original uncompressed information. This simplifies the design of the data deformatter by providing a regular and expected structure for the data stream recovered from tape. This regular structure allows "intelligent" deformatting of the data because certain patterns may be identified as errors and ignored.

Heretofore, various digital video compression studies have focussed on the two-dimensional discrete cosine transform (the DCT) for use as the preferred adaptive coding vehicle, due to its energy compaction properties and relative ease of implementation with digital circuits. (See "Discrete Cosine Transform," *IEEE Transaction on Computers,* Vol. C-23, Pgs. 90–93, Jan. 1974.) To perform a transformation on a video image, the image is first divided into blocks of pixels (e.g. 16×16 or 8×8), and then cosine transformed into a set of transform coefficients, each of which represents a scalar weighting parameter (i.e., a coefficient) for a two-dimensional cosine transform function. In the cosine transform domain, the amplitude coefficients are concentrated at the lower frequency terms, with many of the upper frequencies being zero valued. If the coefficients are coarsely quantized into integral values and then Huffman coded, the number of bits needed to represent the image is greatly reduced. A key factor in making this scheme work effectively is the quantizing process. If the quantization is too fine, the data generated by the Huffman coder will exceed the data rate of the channel (or recorder), while too coarse a quantization results in unacceptable distortion/noise.

One technique for determining a suitable quantization parameter for the required data rate simply monitors an output buffer memory and uses a feedback scheme to adjust the quantization level to maintain an equilibrium of data in the buffer. Thus, in a less complex part of an image, less data enters the buffer memory to decrease the contents, while in a more complex part of the image the buffer input data rate increases to increase the buffer content. This method is described in the article, "Scene Adaptive Coder" by Chen et al., appearing in *IEEE Transactions on Communications*, Vol. Com. 32, No. 3 (March 1984). It is also described in U.S. Pat. No. 4,302,775. However, in recording processes, methods utilizing buffer fullness do not lend themselves to accurate rate control over small amounts of information, and thus do not enable efficient and accurate editing and picture in shuttle. Bit allocation methods as utilized in the past do not produce the quality of images that are desired if a relatively wide range of different images defined by the data are to be reduced.

In some instances, such as the one described immediately above, a threshold level is applied to the transformed data coefficients. That is, all values below a certain threshold are considered to be zero. This thresholding also is often considered to be quantization, and as used herein the terminology applying a "quantization" or quantizing parameter is meant to include applying a threshold level value, a scaling factor or other numerical processing parameter.

It is generally desirable to vary the quantizing parameters to produce the smallest increase in visible distortion of a compressed video image while still providing a desired output data rate. The parameter which may be changed to best advantage changes as the data rate changes, which is a function of the information content of the image. Different sources of data and to a lesser degree different images are optimally quantized by different strategies since the information content thereof changes. The distortion problem is particularly acute in many television applications in which reprocessed image quality is important. It is also necessary in most of such applications that multiple generations of compression, that is, multiple compression/expansion cycles, be made without noticeable degradation.

In order to circumvent the problems created when attempting to compress data such as, for example, video signals to be recorded via video tape recorders, wherein specific units of video data must fit within an allotted recorded data sync block length, the video image data preferably should not be taken sequentially, nor should the data be successively taken from the same area of the image. In such a selection process, the portions of the image with low complexity are finely quantized, whereas the complex portions of the image are coarsely quantized. The resulting picture is very high in quality in low complexity areas and poor in quality in the complex areas.

By way of illustration it is assumed that an image to be compressed and recorded or transmitted, is a scene of a harbor including the relative complexity of boats, people and shops against a background of ocean and a clear blue sky. If data is taken sequentially, the areas of lower complexity such as the sky or ocean can be encoded with fewer bits, while the area of the scene with the boats and people is of greater complexity and requires a greater number of encoding bits to prevent image distortion. If the encoded data is to be fitted into preselected fixed length sync blocks, such as when recording on tape, but the data is taken sequentially, the areas of sky and ocean are allotted the same number of bits per sync block as are the areas of boats and people. However, since the sky or ocean is less complex, only a small fraction of bits in the sync block are needed by the coded transform coefficients to completely encode the information. The remaining bits of the sync block are simply assigned zeros and therefore are wasted. Further along the process of compressing the harbor scene data, the more complex data corresponding to the boats and people are encoded, and now there are insufficient bits available to encode the data without distortion. That is, the number of bits required to properly encode the more complex portions of the image with minimum distortion, will not fit within the space allotted on the tape. Thus, the complex portions of the image must be coarsely quantized to "force" the information to fit within the fixed sync block length. This is true even though the fixed sync block lengths which contain the less complex sky and ocean image data are finely quantized with much wasted space within each block length. It may be seen that this problem of efficiently apportioning bits to image areas of differing complexities is compounded by supplying the data corresponding to the image in sequential order, as is commonly done.

Thus, it may be seen that there are two conflicting requirements when attempting to use data compression techniques in combination with professional video recorders. On the one hand it is desirable from the standpoint of video recorder design to allocate a sync block a fixed segment on the recording medium. On the other hand it is desirable from the standpoint of efficient data compression to allocate a variable output format to provide an image transmission with minimal distortion. Thus, what is desired is a way of achieving these two seemingly conflicting requirements.

SUMMARY OF THE INVENTION

The present invention circumvents the problems of previous discussion when attempting to compress and decompress data, such as for example a television signal, by providing a shuffling/deshuffling technique which combines portions of the more complex areas of the image with portions of less complex areas, to thereby equalize the complexity of each data set being encoded. More particularly, the shuffling technique assembles preselected portions of the image into successive data sets, such that every data set contains essentially the same amount of image information. To this end in the video field, the video image is divided into a multitude of small geometric blocks, herein termed image blocks, wherein each image block represents a specific portion of a video field or frame taken from a respective location in the image. A predetermined number of image blocks taken from diverse spatial locations in the image are combined to form a "data set". A large plurality of data sets, each formed of the same number of image blocks, thus each contain information whose complexity corresponds generally to the complexity of the entire video image. Each of these data sets are compressed to fit into an allotted space, or recorded data sync block, on the recording medium. That is, the number of data bits of each encoded data set is commensurate with the length of the data sync block in the record format. It follows that a field or frame of compressed data advantageously takes up a fixed amount of recorded data space, thereby allowing the recorded data to be easily recovered and edited. In addition, the picture in shuttle process is simplified, because each recorded data sync block in the record format now relates to a specific portion of the video field or frame which can be recovered at such higher recording medium speeds.

More particularly, the invention technique provides for the selection of image data from different spatial locations in the picture as directed by a selected algorithm, whereby the statistical information content for each of a plurality of data sets formed of the image blocks will be similar to each other, as well as to the average information content for the entire field, or frame. Therefore, the quantizing level subsequently required to provide the desired degree of compression will tend to be the same for successive data sets taken from the same video image. This keeps the quality of the compressed/decompressed picture independent of local changes in picture complexity. Although a preferred algorithm is described herein by way of example, it is to be understood that various other algorithms may be used, as discussed further below.

Accordingly, a preferred embodiment of the invention provides a technique which divides the data image into, for example, a 92×61 array of small geometric image blocks, and then which selectively shuffles selected groups of the large number of image blocks via, for example, suitable memory and selected write and read addressing sequences. The shuffling equalizes the complexity of the image in the resulting data stream supplied to the subsequent encoding and compression system. By way of example only, 23 image blocks are selected from different spatial locations in the video image as determined by the selected algorithm, to define a "data set" of 23 image blocks. In addition, each image block of a data set is selected from a different column or row than any other image block of that data set, and every image block is used but only once. This tends to break up the most frequent types of long range correlation between the blocks in the video image in the horizontal and vertical directions. Successive data sets (for example 244 data sets) of 23 image blocks each, are assembled via the algorithm exemplified herein and the memory addressing sequences, wherein the complexity of each data set very closely approximates the complexity of every other data set. That is, the specified selection of image blocks provides an optimum statistical sampling of the complexity of the video image. Thereafter, when the resulting data stream is compressed, each data set is compressed using essentially the same quantization parameter, and requires essentially the same amount of space on the recording medium.

In the deshuffling process, the recorded data sync blocks are recovered, are decompressed and are supplied to a deshuffling circuit generally similar to the shuffling circuit, and which includes memory similar to the memory in the shuffler circuit. The memory selectively stores successive shuffled data sets and supplies deshuffled image blocks representative of the original image. Thus in a preferred embodiment, the image blocks of image data are written into the shuffling memory in the shuffling circuit in sequential raster order in response to the write address, and are read out of the memory in the desired shuffled order as directed by the read address corresponding to the selected algorithm. In the deshuffling circuit, the shuffled image blocks of the image data are written into the deshuffling memory in the shuffled order as determined by the same algorithm. However, the roles of the write and read address generators are reversed from their roles in the shuffling circuit of FIG. 4. That is, the memory locations generated by the read address generator of the deshuffling circuit are the same as those generated during shuffling by the write address generator of the shuffling circuit. The memory locations generated by the write address generator of the deshuffling circuit are the same as those generated during shuffling by the read address generator of the shuffling circuit. Thus, the stored image data are read out of the deshuffling memory in the sequential raster order applied by the write address.

In an alternative technique,, the writing and reading orders may be reversed in both the shuffling and deshuffling memories, whereby the image blocks are written into the shuffling memory in shuffled order and read out in sequential order, and upon subsequent recovery, are written into the deshuffling memory in sequential raster order and read out in the shuffled order.

Although the invention is described herein as including the step of dividing the image data into an array of image blocks, it is to be understood that the image data may be transformed first, and the resulting transformed data coefficients then may be divided into the multitude of "image blocks" or more precisely coefficient blocks. That is, the step of dividing up the image data can be performed to define blocks of transform coefficients rather than blocks of pixels. Accordingly, the term "image blocks" is herein meant to include very small blocks of data representing the image data before or after a transformation process, such as a DCT, takes place.

Alternately, the image blocks may be selected in a pseudo-random manner as directed by a corresponding algorithm, rather than being selected via the geometrically oriented algorithm described herein by way of example. As before, only one block may be taken from any line of blocks in any horizontal or vertical direction, and every image block is used to form the image. In addition, the numbers in the algorithm exemplified below may be varied to modify accordingly the image block selection pattern.

The invention is described herein in terms of two-dimensions, that is, in a single field, frame or group of video, wherein data sets are formed of blocks taken from spatial locations. However, the technique may be utilized to shuffle data wherein blocks are taken from different spatio-temporal locations, that is, from different fields, frames or groups which occur successively in time.

The shuffling/deshuffling technique also may be utilized in a system wherein the shuffling/deshuffling algorithm may be adaptively selected commensurate with the consistency of the values of the quantizing factors used for successive data sets in the subsequent compression process. For example, a condition where the quantizing factor value varies substantially for each successive data set indicates that the relative information content of each data set is also varying. This in turn indicates that the selected shuffling order may not be the best for the particular image. Therefore, if a comparison is made of successive quantizing factors, and if the difference between successive quantizing factors for each data set exceeds a selected threshold, a switching signal is supplied to the shuffling circuit to change the order of shuffling applied to the next field of data. The selected shuffling order also is recorded as overhead information on the recording medium so that it subsequently may be supplied to the deshuffling circuit to allow the latter circuit to use the inverse of the same shuffling order.

BRIEF DESCRIPTION OF THE DRAWINGS

For a better understanding of the invention as well as other objects and further features thereof, reference is made to the following description which is to be read in conjunction with the accompanying drawing wherein:

FIGS. 4 and 5 are block diagrams illustrating exemplary circuit implementations for accomplishing the shuffling/deshuffling process of the invention combination.

FIGS. 6 and 7 are block diagrams illustrating the shuffling process as performed on image data and transformed image data, and exemplifying an implementation for providing adaptive quantizing factor selection.

DESCRIPTION OF THE PREFERRED EMBODIMENTS

As discussed above relative to the harbor scene, the amount of data required to describe the sky is less than that needed to describe the more complex portion of the image containing the boats and people. If the fixed sync block lengths are composed of compressed successive portions of the image as sequentially recovered in a television raster scan, then some sync blocks will have almost no data, while sync blocks from more complex portions of the image will have excessive data. The latter condition requires the use of large quantizing factors, which leads to undesirable distortion in the complex portions of the image. On the other hand, the same scene requires a smaller quantizing factor value if first shuffled by the invention technique, resulting in a minimum of distortion in the complex portions of the image.

It is desirable to use variable rate coding in broadcast television to compress video data. However, as mentioned previously, variable rate coding by its nature inherently produces data blocks of variable length. The present invention alleviates this problem by providing a statistically averaged segment of video data to optimize the subsequent determination of the quantizing factor to be used in the compression process. The statistical averaging of information content is accomplished by assembling small portions of the data from different spatial locations in the image (e.g., in the field or frame) to provide the previously mentioned data sets of statistically averaged information complexity. It is to be understood that different amounts of data may be shuffled as a data set, or group, and thus a group may comprise a field, a frame or a portion of a field. In practice, the multitude of image blocks of video data are selected in such a way that the blocks which comprise a data set are scrambled, or "shuffled", with respect to their normal location in the image. The blocks which make up a set are selected according to an algorithm, as further discussed below. The quantizing factor is applied to the data sets in the compression process, wherein each one of the data sets (244 in the preferred embodiment) define a successive averaged portion of the video image to be compressed.

Figure 1:
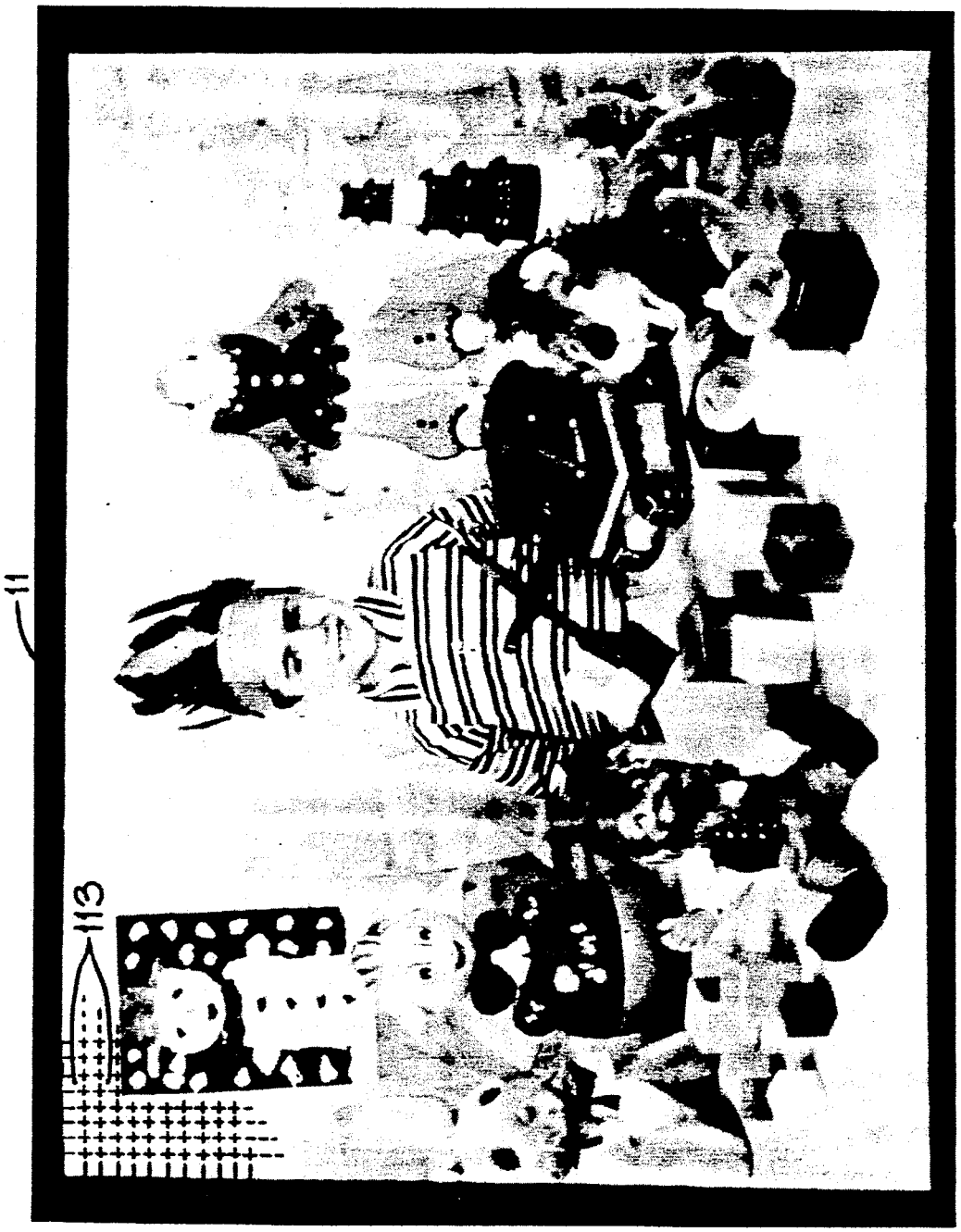
FIG. 1 is a view of a video image, depicting the manner in which the video image is divided into a multitude of image blocks.

To provide a clearer understanding, FIG. 1 depicts a television image 11, a small upper left corner portion of which is divided into a predetermined multitude of image blocks 13. It is understood that the division of the entire image into the image blocks is not visible, but is performed electronically. Thus, the image blocks are represented over the small portion of the image by dashed lines for purposes of description only. Each of the image blocks 13 contains the characteristic, that is, the information content, of the image display at the corresponding spatial location of each block. In the preferred embodiment, the video image consists of the CCIR-601 component color television standard (by way of example only), and therefore, the video image is defined by three components of the video signal; namely, a luminance component (Y) and two complementary chrominance components (R-Y) and (B-Y). Each image block is formed of a given number of pixels, and corresponding samples, of the image. In this example, a (Y) block may comprise four pixels vertically and eight pixels horizontally, whereby the data represented in FIG. 1 within an image block 13 defines only the luminance component (Y) of the 4×8 group of pixels in the image block at such a spatial location. That is, the image blocks shown in FIG. 1 contain only the luminance video information corresponding to the (Y) component video signal. If the image 11 were displayed in color, then the image blocks 13 would also contain color information in the form of the chrominance components (R-Y), (B-Y), as well as the (Y) component. However, it should be understood that the shuffling/deshuffling technique of the invention may be used to statistically average luminance and/or chrominance data signals separately, or other types of correlated data signals, as exemplified via the circuits of FIGS. 4, 5. The luminance and chrominance signals are mentioned herein as typical of signals to be shuffled by way of example only, and to facilitate the description of the preferred embodiment in which the shuffling/deshuffling technique is employed.

The size of the image blocks preferably is selected relative to the transformation and coding scheme to be truly representative of the video image. That is, the size selected should not be so large that the data in the majority of image blocks is not correlated, nor so small that there exists strong correlation between a large fraction of adjacently located blocks. Thus, in the particular embodiment being described, wherein a field of video is being encoded and compressed, the image blocks of luminance video data are illustrated as four pixels vertically and eight pixels horizontally. A pixel is a luminance sample of the continuous time analog video waveform taken at every sample time. Thus, a (Y) sample is taken at the first pixel in the top, left corner of the first video line of an image block. At the time of the next pixel, a new (Y) sample is taken and so on sequentially for each of the eight pixels across each of the four successive lines in each luminance image block. In an implementation where chrominance components (R-Y), (B-Y) are being shuffled, the chrominance components are sampled at half the rate of the luminance sample rate because the chrominance components in the example standard (i.e., CCIR-601) have one half the bandwidth.

Figure 2:
FIG. 2 is a view depicting a display of the video image of FIG. 1, but which is produced by the data stream generated after the image is shuffled (i.e., the shuffled image) by the present shuffling technique.

In keeping with the invention, the image blocks which form each data set of, for example, the image of FIG. 1, are shuffled via the circuit of FIG. 4 in accordance with a selected algorithm described below, to provide the statistical averaging of the data sets. In the reverse process, the data sets are recovered and are deshuffled via the circuit of FIG. 5 in accordance with the same algorithm. FIG. 2 illustrates the video image as it would appear after the data has been shuffled in accordance with the invention, and the resulting shuffled data stream is displayed. Image blocks 13 are taken from over the video image of FIG. 1 in accordance with the shuffling algorithm, which provides the selection pattern as illustrated in particular in FIG. 3. It is understood that although the image as shown in FIG. 2 is decorrelated, the pixels within the image blocks 13 are not. The pixels within each block are maintained in the same order that they are in the image of FIG. 1, throughout the processes of shuffling, compression, decompression and deshuffling. As previously mentioned, FIGS. 1 and 2, which are black and white images, illustrate only the luminance component of the video display rather than the full color video display.

In the shuffling technique, as directed by the algorithm, each of the 23 image blocks combined to form a data set is selected from a different column and different row than every other image block of that data set. That is, for each data set within an image one and only one image block is taken from any one column or row of all the columns and rows of that image. Also, all image blocks in the image must be used, but only once.

More particularly, for a single video field of 736 pixels horizontally and 244 pixels vertically, there are 736/8=92 blocks (8 pixels wide) horizontally, and 244/4=61 blocks (4 pixels high) vertically. (Incidentally although the CCIR-601 standard defines 720 active pixels horizontally, we have chosen to use 736 for numerical convenience.) If there are 23 blocks per data set, then there are 92/23=4 data sets per row of blocks, as can be seen in the shuffled image of FIG. 2. That is, as shown in FIG. 2 as four vertically extending sections, four data sets of 23 image blocks each, extend across the width of the shuffled "image" to define each row of image blocks. It follows that there are 4×61=244 data sets herein numbered 0 through 243.

The image blocks 13 of each data set are shuffled in response to the particular selection pattern, to provide the succession of shuffled data sets, wherein each shuffled data set then is processed as a group through the subsequent transform and compression processes, as depicted in FIGS. 4, 6. Beginning with the image blocks in the upper left hand corner of the displayed video image of, for example, FIG. 1, the x and y index of each shuffled image block may be given by the following algorithm:

$$x, y = 4c + v \bmod 4, (17c + 25v) \bmod 61$$

where, x = the horizontal block index,
y = the vertical block index,
v = the data set number 0, 1, 2 ... 243,
c = the output image block number 0, 1 ... 22 within a data set, and mod 4 and mod 61 = modulo base 4 and modulo base 61.

Figure 3:
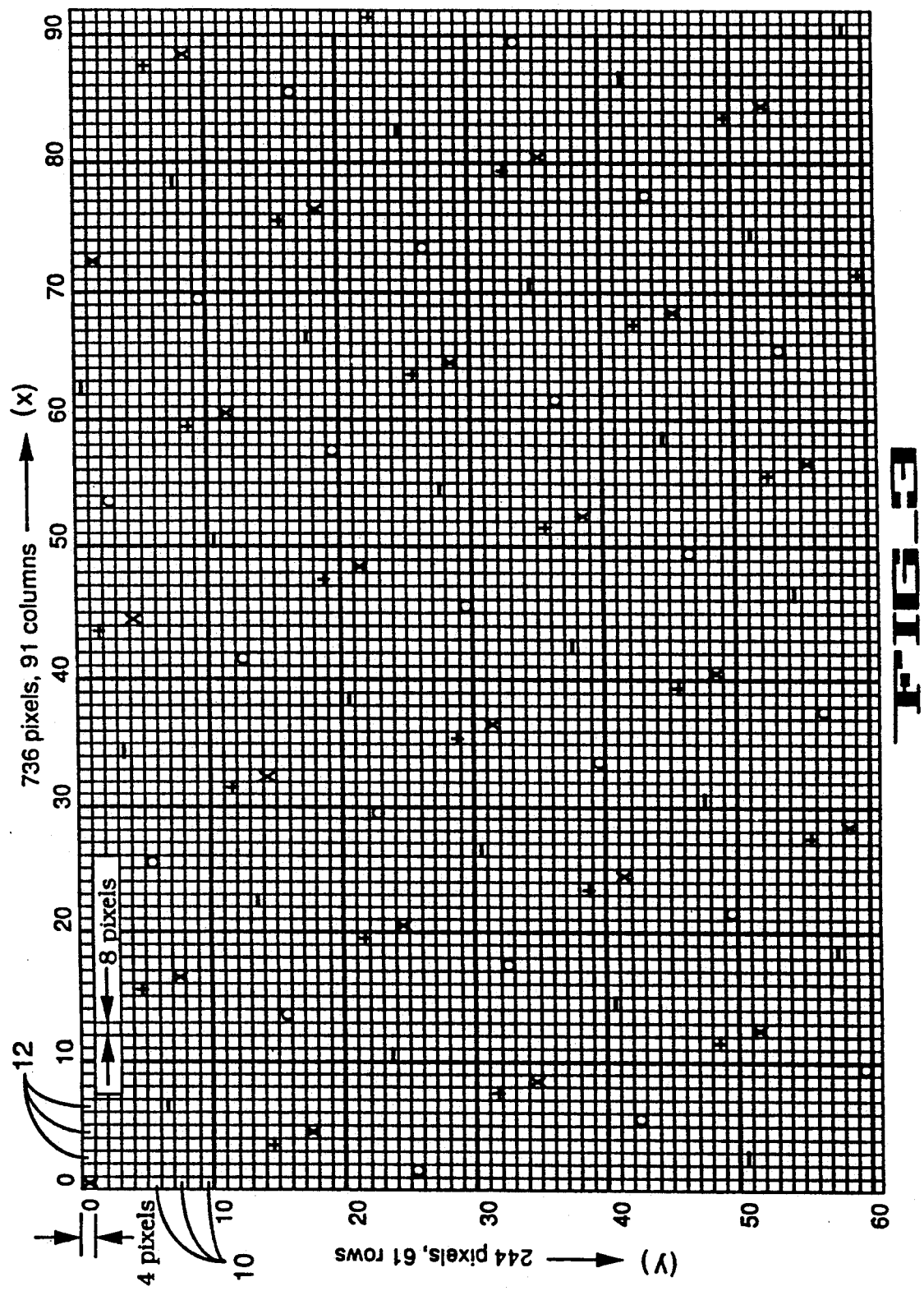
FIG. 3 is a plan view of a data image, such as the video image depicted in FIG. 1, illustrating the distribution of the image blocks selected via a respective algorithm to form a succession of data sets representing the image.

This equation defines the membership of a data set where (x,y) is the index of the block. The pixels which are members of a luminance block, and the shuffled output data sequence for block x, y equals, Pixel No._{Line No.} = $8x_{4y}, 8x+1_{4y}, \ldots 8x+7_{4y},$
$8x_{4y+1}, 8x+1_{4y+1} \ldots 8x+7_{4y+3}$ FIG. 3 illustrates the process of selecting the image blocks (13 in FIGS. 1, 2) from different spatial locations in the image, to form each data set of shuffled image blocks in accordance with the algorithm described above. To this end, by way of the above example, the image is divided into rows of blocks (labeled item 10) and columns of blocks (labeled item 12), with 92 columns of image blocks horizontally (labeled 0–91) and 61 rows of image blocks vertically (labeled 0–60). As mentioned, each luminance block contains eight pixels horizontally and four pixels vertically, whereby each contains a total of 32 pixels of luminance component video data. Thus, in the example herein, the luminance image is divided into a total of 5,612 image blocks, and there is a total of 5,612/23 or 244 data sets. FIG. 3 depicts the distribution of the image blocks as selected via the algorithm to form the first four of the possible 244 data sets, wherein the 23 image blocks of the zero, first, second and third data sets are represented by the symbols (x), (o), (−) and (+), respectively, on the FIG. 3. As determined by the algorithm, if v=0 (the number of the data set zero) and c=0 (the number of the output image block) then the zero image block identified herein by the symbol (x) is taken from the upper, left corner of the image, that is, from the block corresponding to the coordinates column zero and row zero. The next image block (x) of the data set zero is selected from the column 4 and the row 17. The next image block (x) is from the column 8 and row 34, and so on across the image, until the 23rd (or last) image block (x) of data set zero is taken from the column 88 and row 8. As may be seen, each image block of the data set zero is taken from a different column or row of the array of blocks than any other block. That is, only one image block of a data set is taken from any one column or row.

The next (one) data set is assembled via the algorithm by selecting the 23 image blocks that are depicted by the symbol (o) and taken from diverse spatial locations in the image depicted in FIG. 3. The zero image block of the data set one is taken from the column 1 and row 25. The next image block is taken from the column 5 and row 42, and so on until the 23rd (last) image block of data set one is taken from the column 89 and row 33. Again, only one image block in the data set one is taken from any one column or row.

The next or data set two then is assembled from the image blocks depicted in FIG. 3 by the minus (−) symbol, followed by the next or data set three depicted by a plus (+) symbol. The selection process continues, using the equations of the above algorithm, until all 244 data sets are assembled to define a field of video data. When all 244 data sets have been completed, all blocks in the original image have been taken, and none have been omitted or repeated. It may be seen that the individual blocks making up a data set are well separated from one another and that no large area of the original image is without any blocks in each data set.

The blocks of the image, continuously available in shuffled order at the output of the shuffler circuitry (FIG. 4), are supplied to the subsequent circuits which perform the transform and compression processes (FIGS. 4, 6), or the compression process (FIG. 7). In the specific implementation described herein, the 23 image blocks are grouped to form respective data sets of the succession of the 244 data sets which define a field of video. Each image block of a data set is identified in its order within the set and, in particular, is identified as the letter c=0,1 . . . 22, in the above algorithm.

As previously mentioned, the assembling of the data sets from image blocks taken from diverse spatial locations in the image, provides the data sets with substantially similar statistical averages which, in turn, assures that the subsequent quantizing factors calculated for the data sets have a narrow distribution of values. In other words, the statistical averaging provided by the shuffling assures that the quantizing factors for the data sets are similar to one another. This aids in providing a more constant length of code even though a variable rate coding process is used. In addition, since the statistical averaging provides substantially the same information content per data set, each data set requires, and fills, the same allotted space on the recording medium.

Reference is made to FIGS. 4 and 5 for exemplary implementations of circuitry for practicing the shuffling/deshuffling technique of the invention. There are three signal components in a component color video signal; however, the luminance component (Y) is depicted herein in FIG. 4 by way of example only, as the input signal to the shuffling/deshuffling circuitry. The luminance component comprises an analog image input signal derived, for example, by sequential television raster scans. However, it is to be understood that correlated data signals other than luminance or chrominance video signals may be shuffled and deshuffled by the technique of the present invention, as further discussed below. For example, the blocks of coefficients which result from a discrete cosine transformation of the blocks of pixels, may comprise the input signals (FIG. 7). Thus, it is to be understood that the term "image data" comprising the input signal supplied to the shuffling circuit, or the output signal from the deshuffling circuit, may be the sequentially scanned image signal such as provided by a monochrome camera, a color camera or a video tape recorder, or may be blocks of the transform coefficients derived, for example, from a discrete cosine transform process performed blockwise on the image prior to the data shuffling process. Likewise, the term "image blocks" is meant to include image blocks of the pixels forming the image, or image blocks of transform coefficients representative of corresponding blocks of the image.

In FIG. 4, the (Y) component of the analog image signal is supplied to a luminance channel 14 via an 8 bit (Y) input line 16. If a chrominance signal is to be shuffled, the (R-Y) and (B-Y) chrominance components would be supplied to a chrominance channel via two 8 bit (R-Y) and (B-Y) lines. The chrominance channel would be similar to the luminance channel 14, but is further adapted to process the two (R-Y), (B-Y) color component signals, wherein each has approximately one-half the bandwidth of the (Y) luminance signal and accordingly requires one-half the sampling rate, one-half of a field store memory, etc.

More particularly, in FIG. 4, the (Y) image signal on line 16 is supplied to a sample and hold (S/H) circuit 20, where it is sampled at, for example a 13.5 MHz rate via a clock on a line 22. The sampled signals are supplied to an analog-to-digital converter (A/D) 24 via a line 26. In practice, the S/H circuit 20 is integral with the A/D 24. The resulting digital (Y) image data is supplied via a bus 30 to a (luminance) shuffling circuit 28 enclosed by the dashed line block. After passing through the shuffling circuit 28, the shuffled data is supplied via an 8 bit bus 32 to a transform and compression system 34. The latter system 34 includes means for suitably encoding the shuffled data sets and for calculating the quantizing factor for the quantization process based on the statistically averaged data sets provided by the shuffling process of the invention. The encoded and compressed data then may be recorded as successive data sets in allotted data sync blocks on a recording medium, depicted herein by a recorder 36, or may be supplied to a transmission channel 38. In the latter application the data is reconstructed at the receiver to provide a suitable video signal for use by associated devices after transmission.

Typical of a transform and compression system 34 for receiving and processing the data shuffled by the instant invention, is the system described in copending U.S. application Ser. No. 07/560,606, filed Jul. 31, 1990, and entitled Data Compression Using A Feedforward Quantization Estimator, assigned to the same assignee, and incorporated herein by way of reference.

The luminance shuffling circuit 28 includes a pair of field store memories 40 and 42, which continuously receive the raster scanned and digitized video image data and output the shuffled image data, in the 8 bit digital sample format. The memories 40, 42 also are alternately switched at the field rate to thus store and recover alternate fields of data. The recovered data is supplied to the transform and compression system 34 in the desired shuffled format determined by the above algorithm. To this end, the digitized output of the A/D 24 is presented to both of the memories 40 and 42 via the bus 30. Each of the memories 40 and 42 includes corresponding field store memory locations for the luminance (Y) data and, in particular, for alternate fields of (Y) data. A timing generator 44 controls which memory is activated at any given time in response to respective write and read signals on RD/WR lines 46, 47, and enable signals on OE lines 48, 49. As illustrated, the RD/WR line 46 and OE line 48 are supplied to the memory 40. The RD/WR and OE control signals are inverted by an inverter 50 before being supplied to the memory 42 via lines 47, 49, respectively. Thus one memory is being written into while the other is being read from on a field-by-field basis. After one field of data, the roles of the memories 40, 42 are reversed. The timing generator 44 provides the memory control signals in response to a vertical blanking signal (V sync) on a line 52 supplied from system control (not shown) to the timing generator 44.

In accordance with the invention, the memories 40, 42 are used alternately to continuously receive and store the data in sequential format, and to then continuously supply the data in shuffled format, on a field-by-field basis. To this end, write address generator 54 controls the alternate storage of data in the memories in a raster scanned, that is, sequential, format, and a read address generator 56 controls reading the data out of the memory which is not currently being written into, in the desired shuffled format. In particular, the write and read address generators 54, 56 receive reset signals related to V sync from the timing generator 44 via respective lines 58, 60. In response thereto, the address generators 54, 56 alternately supply write or read address signals to one or the other of the memories 40, 42. To this end, the output of the write address generator 54 is supplied by a bus 62 to the A and B inputs, respectively, of a pair of multiplexers 64 and 66 associated with the memories 40 and 42. In response to the write address generator 54 and either the multiplexer 64 or 66, the write address loads the data into the memories 40 or 42 in the order in which the samples and lines of video are scanned in the image, namely, in a television raster scan sequential format. The read addresses initiated by the generator 44 and supplied by the read address generator 56, are directed to the B and A inputs, respectively, of the multiplexers 64 and 66 via a bus 68. The read addresses correspond to the memory locations determined by the algorithm selected. Multiplexer 64 supplies the read or write address signal, which is active at any given time, to the memory 40 via an address bus 70. The multiplexer 66 supplies the read or write address signal which is active at any given time, to memory 42 via an address bus 72. Timing generator 44 controls the individual multiplexers to activate the read or write addresses in relation to V sync, via buses 74 and 76 coupled to respective A/B inputs of the multiplexers 64, 66.

Read address generator 56 generates addresses in such a way that the sequentially stored image data are read out of the memories 40, 42 in the requisite shuffled image block order which, in this example, is determined by the algorithm described previously. For example, there are 736 samples in a line of video, as is the case in the CCIR 601 component color television standard, and the luminance samples are stored in sequential memory locations via the write address generator 54 beginning with location 0, 1, 2, 3, 4, ... etc. If a (4×8) image block of the c=0 (zero) data set is to be read out from memory, the read addresses for the data are 0, 1, 2, 3, 4, 5, 6, 7 for the first line of the zero block, 736 ... 743 for the second line of the zero image block, 1472 ... 1479 for the third line of the zero block, and 2208 ... 2215 for the fourth line. Each image block is fully read out from the memory before proceeding to read out the next image block of a data set, wherein the order of the next image block (and following 21 image blocks) of the data set to be read out is determined by the shuffling algorithm. The resulting data stream on the bus 32 from the memories 40, 42, is a shuffled succession of coherent image blocks, with 23 successive shuffled image blocks defining each data set. The above numbers are true when handling the image data on a field-by-field basis, and assuming that each address location holds 1 byte of data and that each pixel is defined by 8 bits. The next image block (that is, block c=1) read from memory comes from a location distributed over the image which is selectively spaced away from the first block, according to the shuffling algorithm and as illustrated in FIG. 3. Since the image blocks forming each data set are taken from geometrically related locations distributed over the image, the complexity of each data set of 23 image blocks is representative of the complexity of the entire field. In the implementation of the invention exemplified herein, the shuffling algorithm, and thus the selection pattern it represents, is contained in the read address generator 56 in the form of memory address groups.

Accordingly, it may be seen that in the example herein, the memory means within which the data is written stores the data in a sequential order corresponding to the location of the corresponding image block in the video image in response to the write address generator 54. Then the read address generator 56 comprises the means for recovering the data in an order which is shuffled relative to the actual locations of the image blocks in the video image, in response to the read addresses therein which are determined by the algorithm. While the shuffled image itself is de-correlated, the data within each image block is not shuffled and remains correlated within the blocks, as discussed above relative to FIG. 2. That is, the pixels within each image block are in the same relative locations as they were in the video image prior to the shuffling process.

It is understood that the order in which the image blocks are written into and read out, of the memory can be reversed. That is, the memories 40, 42 may be loaded with the image blocks in shuffled order by using the shuffled memory locations supplied by the read address. Then the data may be read out sequentially using the write address to scan the memory locations.

After reading the pixels from the field store memories 40, 42, using the address sequence generated by the read address generator 56 to produce the data sets of shuffled image blocks, the data sets are supplied to the transform and compression system 34 via the bus 32. The system 34 then encodes the data and calculates the quantizing factors for quantizing the data sets, using any of various data quantizing processes. Because each data set represents a statistical average of the information in the entire image, the values of the quantizing factors will be substantially similar, that is, there will be a narrow distribution of weighting coefficient values. This increases the efficiency of the compression process.

FIG. 5 illustrates an embodiment of circuitry for performing the inverse shuffling (deshuffling) process to recover the original analog image signal, such as supplied to the input bus 16 of FIG. 4. As may be seen, the deshuffling circuit is similar to the circuit used in the shuffling process of FIG. 4. The recovered data is supplied by means of a recorder such as the recorder 36, or via a transmission channel such as bus 38 (FIG. 4), to a decompression and inverse transform system 108 via a bus 110. The system 108 performs the inverse functions of the transform and compression system 34 of FIG. 4, and supplies the resulting decompressed and inverse transformed data to a deshuffling circuit 128. The shuffled image data is supplied on a bus 112 and is essentially the same as the shuffled image data on the bus 32 of FIG. 4.

The deshuffling circuit 128 is unlike the shuffling circuit 28, in that the address signals which are supplied to similar field store memories 140, 142 during the write and read cycles are exchanged. For example, the memories 140, 142 are written into using the read address signal supplied by a read address generator 156, and are read out using the write address signal supplied by a write address generator 154. As in FIG. 4, the write and read addresses are supplied in response to the reset signals from a timing generator 144. Thus the shuffled image blocks comprising the shuffled data on bus 112, are stored in memory in the sequential memory locations of previous description. The stored image blocks then are sequentially retrieved from the memory locations in the deshuffling memory. The resulting output data signal on an output bus 178 is deshuffled image data corresponding, for example, to the original image data on bus 30 of FIG. 4. The image data on bus 178 is converted to an analog format via a digital-to-analog converter 180, and is filtered via a reconstruction filter 182 to recover the original analog image signal on an output bus 184.

As previously mentioned, the chrominance image data (R-Y), (B-Y) is another signal which may be shuffled, separately from the luminance data (Y), via a respective chrominance channel. The channel includes a chrominance shuffling circuit which is generally similar to the luminance shuffling circuit 28. The shuffled chrominance data also would be supplied to a transform and compression system such as system 34 of FIG. 4. If a complete component color signal is being compressed, the chrominance components are supplied to the transform and compression system, generally, but not necessarily, in synchronism with the complementary shuffled luminance data on the bus 32 of FIG. 4.

By way of further description, in the present shuffling/deshuffling system, the analog chrominance (R-Y) and (B-Y) image data also would be supplied to respective sample and hold circuits. Each of the (R-Y) and (B-Y) streams of data are sampled at a 6.75 MHz rate, to supply analog (R-Y) and (B-Y) chrominance signals to the two inputs of an analog multiplexer. The analog multiplexer is switched at a 6.75 MHz rate via a suitable timing signal, to supply a color data signal of alternate (R-Y), (B-Y) values to an A/D converter. The A/D converter supplies a data stream of digitized (R-Y), (B-Y) chrominance samples to a pair of field store memories in a configuration generally similar to that of the luminance channel 14. However, the memories each would be divided in half such that, in this example, the (R-Y) data is stored separately from the (B-Y) data. This facilitates not only writing the color data sequentially into memory, but also facilitates reading the (R-Y) and (B-Y) data out of respective portions of the memories in the shuffled format. A timing generator such as generator 44, supplies R/W and OE signals to the memories. The (R-Y) samples which are alternating with the (B-Y) samples in the data stream, may be sequentially written into the (R-Y) portion of one of the memories, while the (B-Y) samples would be sequentially written into the (B-Y) portion of the same memory when the latter is enabled. That is, when shuffling a signal such as the color difference signals, the data sets formed from the chrominance samples may be in a first order of all (R-Y) blocks of a data set, followed by all (B-Y) blocks of a data set. In a second order, the data sets may be formed by alternating (R-Y) and (B-Y) blocks of the same data set as required by the compression system. In still a third order, all (R-Y), or alternately (B-Y), blocks for all data sets are recovered grouped together, followed by the (B-Y) (or alternately R-Y) blocks for all data sets grouped together. Thus it may be seen that the invention is applicable to various orders in which the image data, or the transformed coefficients, may be stored and/or recovered.

In any of the examples, as in the luminance channel 14, the (R-Y) and (B-Y) data may be written into the alternate memories in either of the above-mentioned orders on a field-by-field basis, while the other memory is being read out.

Readout of the chrominance data also may be performed in the manner of the luminance data readout, in accordance with the shuffling pattern determined by the algorithm. However, the readout process provides shuffling of the sequentially stored image blocks of the two chrominance components (R-Y), (B-Y) as the data alternately are recovered from the (R-Y) and (B-Y) portions of the memories. For example, a (R-Y) block of data set one would be recovered, followed by a (B-Y) block of the data set one, followed by another (R-Y) block and (B-Y) block, etc. The readout further is performed alternately from one memory or the other memory on a field-by-field basis. The output stream of shuffled (RY), (B-Y) chrominance data blocks then are supplied to the transform and compression system such as the system 34, of FIG. 4.

FIG. 6 illustrates a preferred environment of the present shuffling technique wherein the image data, in the form of the successive data sets of image blocks, is supplied to a shuffling means such as the shuffling circuit 28 and channel 14 of FIG. 4. The shuffled data is supplied to a transform means such as for example, the discrete cosine transform circuit 131 depicted here. The resulting shuffled blocks of transform coefficients are supplied to a data compression circuit 133, such as that described in the application U.S. Ser. No. 07/560,606 of previous mention, which determines a quantizing factor for successive data sets and performs the compression process to provide a compressed image data output. In the system of FIG. 6, data shuffling in accordance with the invention is performed on the image data derived by sequentially scanning the image. As further shown in FIG. 6, quantizing factors used in successive segments of data are compared via a Q comparison circuit 135, to determine if the quantizing factor values are varying substantially. Such a condition indicates that the selected shuffling algorithm may not be optimum for the image. The Q comparison circuit 135 makes a comparison, and if successive quantizing factors exceed a selected threshold, a switching signal is supplied to the shuffling means 14,28 to change the order of shuffling, that is, the algorithm, applied to the next field of data. The selected shuffling order also is forwarded for subsequent use in the deshuffling process.

FIG. 7 depicts an alternative system in which the image data first is transformed by, for example, the discrete cosine transform circuit 131 of previous mention, and then is shuffled in accordance with the present invention. To this end, the transform circuit 131 supplies successive data sets of image representing blocks of transform coefficients, to a shuffling channel 14 and circuit 28 such as described in FIG. 4 . Thus, in the system of FIG. 7, data shuffling in accordance with the invention is performed on the image data after it is in the transform coefficient format.

In either of the systems of FIGS. 6 or 7, the deshuffling process may be performed after the decompression process and before or after the inverse discrete cosine transform process.

While the invention has been described with respect to various preferred embodiments, it will be recognized by those skilled in the art that further modifications and alterations are contemplated within the scope of the invention. For example, it may be desirable to provide statistical averaging in compressing video data regardless of whether such data is to be recorded on a suitable medium. The shuffled and compressed data may instead be used in a satellite transmission system. Moreover,, although a single field of video is shuffled in the exemplary embodiment described herein, it will be recognized that different amounts of data may be shuffled as a group or data set. For example, video information defining a frame, a plurality of successive frames, or a group of data other than fields or frames, may be shuffled to take advantage of the properties of the statistical averaging process. Thus a group of data may comprise a field of video image data, or a selected fractional portion of a field. In shuffling and coding frames of data, various numbers are changed such as, for example, each image block may be formed of twice the data in an ($8 \times 8$) pixel array for the (Y) blocks, or a corresponding doubling of the pixel array for the chrominance (R-Y) and (B-Y) blocks.

As previously mentioned, alternative algorithms may be used in place of the specific algorithm described herein, to provide not only geometrically selected blocks taken from a matrix of image blocks, but also pseudo-randomly selected blocks taken from the matrix. Any such pseudo-random order must be arranged so that all blocks in the image are selected once, with none omitted or repeated. In addition, the numbers of the algorithm are different, for example, in a color television format which uses 625 lines rather than the 525 lines as exemplified herein.

Further, although the invention is described as selecting and shuffling data taken from spatial, that is, two-dimensional, locations on an image, it also is applicable to the shuffling of data taken from spatio-temporal, or 3-dimensional locations. For example, since there is redundancy in the temporal dimension, compression using the 3rd dimension of time may be used, for example, in a 3-dimensional discrete cosine transform (DCT) process. In such a scheme, 3-dimensional compression blocks (cubes) would consist of a number of 2-dimensional blocks taken from the same locations within several frames of a multi-frame sequence. In this case, shuffling may be performed by forming data sets from groups of 3-dimensional cubes.

What is claimed is:

1. A method of conditioning data representing an image for recording the data onto a recording medium or for transmitting the data over a channel, said method comprising the steps of:
   dividing the image data into a multitude of contiguous image blocks, each image block being associated with a corresponding spatial location of a portion of said image and defining one or more characteristics of said portion at the respective spatial location; and,
   shuffling said image blocks by selecting image blocks from preselected spatially diverse locations in the image as determined by a block selection pattern, wherein combined preselected image blocks in the resulting shuffled image contain a spatially equalized distribution of the information contained in the image.

2. The method of claim 1 further comprising the steps of:
   grouping said shuffled image blocks to form successive pluralities of shuffled image blocks.

3. The method of claim 1 wherein the step of shuffling further includes assembling a plurality of sets of data each formed of a selected plurality of image blocks.

4. The method of claim 3 wherein:
   the step of dividing the image data further includes dividing the image data in equally sized image blocks arranged into a preselected plurality of rows and columns of said image blocks; and
   the step of shuffling includes taking only one image block from any one row or column of said image blocks when grouping to form each of said sets of data.

5. The method of claim 3 wherein the data representing an image further includes video image data.

6. The method of claim 5 further including:
   transforming the video image, prior to the step of dividing, to define image blocks of transform coefficients; and
   assembling a plurality of sets of data formed of selected image blocks of transform coefficients representative of a statistical average of information in the transformed video image.

7. The method of claim 5 wherein the step of shuffling includes:
   storing said plurality of image blocks in a shuffled order relative to the original locations of said image blocks in said video image; and
   retrieving the stored and shuffled image blocks in a raster scan block-by-block order.

8. The method of claim 7 wherein:
   the step of shuffling is defined by the algorithm:

$(x,y) = 4c + v \bmod 4, (17c + 25v) \bmod 61,$ wherein
   x = the horizontal block index,
   y = the vertical block index,
   v = the set of data number
   c = an output image block number within a set of data; and,
   the data representing an image further includes 525-line video image data.

9. The method of claim 8 wherein the step of assembling includes selecting 23 image blocks from different spatial locations in the video image to form a data set, and assembling 244 successive data sets to define the video image.

10. The method of claim 1 wherein the step of shuffling includes:
    assembling said image blocks from the spatially diverse locations in the image into a stream of image blocks containing a spatially equalized distribution of the information in the image.

11. The method of claim 10 wherein the step of assembling includes:
    grouping said shuffled image blocks to form a plurality of groups of assembled image blocks; and
    digitally compressing the image data by separately compressing the data in each of said groups of assembled image blocks.

12. The method of claim 10 wherein random segments of said stream also contain the spatially equalized distribution of the information in the image.

13. The method of claim 10 wherein:
    the step of dividing the image data further includes dividing the image data into equally sized image blocks arranged into a preselected plurality of rows and columns of said image blocks; and
    the step of assembling includes taking only one image block from any one row or column of said image blocks to form said stream of image blocks.

14. The method of claim 10 wherein:
    the data representing an image includes fields and frames of video image data; and
    said stream of image blocks includes a field worth of video image data.

15. The method of claim 14 further including:
transforming the video image, prior to the step of dividing, to define image blocks of transform coefficients; and
assembling a stream of shuffled image blocks of transform coefficients containing a spatially equalized distribution of the information in the transformed video image.

16. The method of claim 14 wherein the step of assembling includes:
storing said field of image blocks in a sequential order corresponding to the original locations of said image blocks in said video image; and
retrieving the stored image blocks in a shuffled order.

17. The method of claim 14 wherein each image block comprises a group of (4×8) pixels of a luminance component, and groups of (4×4) pixels of chrominance components, of said video image.

18. A method for shuffling data defining at least a portion of a video image, wherein the information contained in the video image varies from more complex through less complex areas of the image, comprising the steps of:
representing said video image by a multitude of image blocks, each of which is associated with a corresponding spatial location of a contiguous portion of said video image and defines one or more characteristics of said portion at the respective spatial location; and
scrambling a minimum plurality of said image blocks by assembling preselected image blocks from said more complex areas of the image with image blocks from said less complex areas, to form a group of image blocks containing a statistical average of the video image information, wherein said scrambled group of image blocks define the shuffled data.

19. The method of claim 18 wherein:
the step of representing includes dividing the video image into a preselected array of said multitude of image blocks; and
the step of scrambling includes assembling a plurality of said groups of image blocks taken from non-contiguous spatial locations in the video image.

20. The method of claim 19 wherein the step of assembling includes:
selecting said groups of image blocks with all image blocks selected once, wherein each of said groups contain a statistically averaged sampling of the video image complexity.

21. The method of claim 19 wherein:
the step of representing includes dividing the video image into a preselected plurality of rows and columns of said image blocks; and
the step of scrambling includes taking only one image block from any one row or column of said image blocks when assembling each of said data sets.

22. The method of claim 19 further including:
transforming the video image prior to the step of dividing to define the preselected array in the form of image blocks of transform coefficients; and
assembling a plurality of groups of selected image blocks of transform coefficients representative of a statistical average of information in the transformed video image.

23. The method of claim 19 including:
storing said groups of image blocks in a shuffled order relative to the original locations of said image blocks in said video image; and
retrieving the stored and shuffled groups of image blocks in a raster scan block-by-block order.

24. The method of claim 19 further including deshuffling of the shuffled data, including the steps of:
storing the groups of image blocks of the shuffled data in a shuffled order; and
retrieving the stored deshuffled image blocks in a sequential order to provide the deshuffled data.

25. The method of claim 19 wherein the step of scrambling includes:
storing said plurality of groups of image blocks in the sequence that they are selected from the video image; and
retrieving the stored plurality of groups of image blocks in a shuffled sequence other than that used in the step of storing.

26. The method of claim 25 wherein the step of retrieving is defined by the algorithm:

$$(x,y) = 4c + v \bmod 4, (17c + 25v) \bmod 61,$$

wherein, x = the horizontal block index,
y = the vertical block index,
v is a group number 0, 1, 2, ... 243, and
c is an output image block number 0, 1, 2 ... 22 within a group.

27. The method of claim 25 wherein the step of assembling includes selecting 23 image blocks from different spatial locations in the video image to form a data set, and assembling 244 successive data sets to define the video image.

28. The method of claim 19 wherein the step of assembling includes:
writing into memory means a first group of image blocks defining a field worth of video data;
writing into the memory means a second group of image blocks defining a second field worth of video data; and
reading the first group of image blocks from the memory means simultaneously while writing said second group of image blocks, wherein the image blocks of the first group are read out in an order other than that in which they were written.

29. An apparatus for shuffling data representing at least a portion of an image, comprising:
means for dividing the data representing the image into a preselected plurality of image representing blocks; and
means for assembling groups formed of the image representing blocks selected from non-contiguous spatial locations in the data image in accordance with a predetermined block selection algorithm which statistically averages the image information contained in the assembled groups.

30. The apparatus of claim 29 wherein said data representing the image are sequentially scanned image blocks formed of a plurality of pixels in the image.

31. The apparatus of claim 29 including:
means for transforming the image into image representing blocks of transform coefficients; and
wherein said data representing the image are formed of a succession of said image representing blocks of transform coefficients.

32. The apparatus of claim 29 wherein the assembling means includes:
   means for storing said image representing blocks of said groups in an order corresponding to the original locations in said data image of the image representing blocks; and
   means for retrieving said image representing blocks of said groups from said storing means in an order in which the image representing blocks are shuffled relative to their original locations in said image.

33. The apparatus of claim 29 wherein the assembling means includes:
   means for storing said image representing blocks of said groups in an order in which the image representing blocks are shuffled relative to their original locations in said image; and
   means for retrieving said image representing blocks of said groups from sequential memory locations in said storing means.

34. The apparatus of claim 29 wherein:
   said dividing means includes means for dividing the image into a multitude of said image representing blocks, each having a respective spatial location in the image; and
   said assembling means includes means for storing the image representing blocks in a sequentially scanned order, and means for retrieving the stored image representing blocks in a predetermined shuffled order which provides successive groups of blocks of statistically averaged image information.

35. The apparatus of claim 34 wherein the image representing blocks of each group are retrieved in accordance with the algorithm:

$$(x,y) = 4c + v \bmod 4, (17c + 25v) \bmod 61,$$

where,
x = the horizontal block index,
y = the vertical block index,
v is a group number 0, 1, 2, ... 243, and,
c is an output image block number 0, 1, 2 ... 22 within a group.

36. The apparatus of claim 34 wherein the assembling means includes:
   means for providing a timing signal related to the sequentially scanned order of the image;
   memory means responsive to said providing means for alternately storing selected groups of the image representing blocks in said sequentially scanned order; and
   readout means responsive to said providing means for alternately retrieving said selected groups of stored image representing blocks in said predetermined shuffled order.

37. The apparatus of claim 36 further including:
   write address generator means coupled to said memory means for supplying thereto a write address for storing the image representing blocks in shuffled memory locations which statistically average the image information in the subsequently recovered groups; and
   read address generator means coupled to said memory means for supplying thereto a read address which retrieves the image representing blocks of each group from sequential memory locations.

38. The apparatus of claim 36 further including:
   write address generator means coupled to said memory means for supplying thereto a sequential write address; and
   read address generator means coupled to said memory means for supplying thereto a read address which retrieves the stored image representing blocks in a selection pattern which statistically averages the image information contained in successive groups.

39. The apparatus of claim 34 for further deshuffling the data representing at least a portion of the image, comprising:
   means for recovering the shuffled data as a stream of successive groups formed of the shuffled image representing blocks;
   means for storing the recovered stream of image representing blocks in the predetermined shuffled block order; and
   means for retrieving the deshuffled stored image representing blocks in the sequential order, to provide the deshuffled data.

40. The method for shuffling data representative of an image, comprising the steps of:
   dividing said data representative of the image into a multiplicity of image representing blocks of random complexities and having respective spatial locations within the image; and
   assembling groups of selected pluralities of said image representing blocks taken from predetermined non-contiguous spatial locations in the image such that all the image blocks in the image are selected once and each group of image representing blocks contains statistically averaged information substantially similar to the statistical average of the information contained in the image.

41. The method of claim 40 including:
   determining quantizing parameter values for said groups which provide a substantially consistent compression of the data contained in the assembled statistically averaged groups; and
   adjusting the step of assembling in response to inconsistencies in the quantizing parameter values determined by the step of determining.

42. The method of claim 41 wherein:
   the step of assembling includes selecting the image representing blocks in accordance with a predetermined algorithm; and
   the step of adjusting includes modifying the predetermined shuffling order to maximize the uniformity of the statistically averaged information content of the shuffled data sets.

43. A method of shuffling data representing an image, comprising the steps of:
   dividing the data representing the image into a multiplicity of contiguous image blocks of random complexities ranging from high to low complexities, and having respective spatial locations within the image; and
   assembling a stream of said image blocks selectively derived in accordance with a predetermined algorithm, to combine non-contiguous image blocks of said high to low complexity from locations throughout the image such that the statistical average of the information contained in a random, statistically significant plurality of image blocks in said stream is substantially the same as the statistical average of the information contained in the image.

44. The method of claim 43 wherein the data includes fields and frames of video image data, wherein:

said step of dividing includes electronically dividing the video image into an array of the image blocks; and said step of assembling includes selecting the non-contiguous image blocks from throughout the array to form a field worth of shuffled image blocks.

45. The method of claim 43 wherein:

said step of dividing includes electronically dividing the data image into a selected array of the image blocks; and said step of assembling includes selecting all image blocks in the array once to assemble the selected stream of image blocks.

46. The method of claim 43 for further deshuffling data which is being recovered as the stream of the selected pluralities of shuffled image blocks representative of the image, comprising the steps of:

storing the assembled image blocks in the shuffled order; and retrieving the stored deshuffled image blocks in a sequential order, to deshuffle the data.

* * * * *